United States Patent [19]

Aerts

[11] Patent Number: 5,798,847
[45] Date of Patent: Aug. 25, 1998

[54] METHOD OF AND APPARATUS FOR CORRECTING THE OUTPUT SIGNALS OF AN ARRAY OF PHOTODETECTOR ELEMENTS

[75] Inventor: Wilhelmus Joseph Aerts, Ja Venlo, Netherlands

[73] Assignee: Oce-Nederland B.V., MA Venlo, Netherlands

[21] Appl. No.: 653,347

[22] Filed: May 24, 1996

[30] Foreign Application Priority Data

May 24, 1995 [EP] European Pat. Off. ............ 95201376

[51] Int. Cl.$^6$ .............. H04N 1/38; H04N 1/40; H04N 9/64; H04N 1/04
[52] U.S. Cl. ............... 358/464; 358/447; 358/461; 358/406; 358/446; 358/482; 358/483; 382/168; 382/270; 382/274; 348/251; 348/241
[58] Field of Search .................. 358/447, 461, 358/406, 466, 445, 446, 465, 522, 494, 451, 464, 482, 483; 382/272, 168, 172, 270, 274, 271; 348/241, 251, 362, 363, 364, 365, 222

[56] References Cited

U.S. PATENT DOCUMENTS

| | | | |
|---|---|---|---|
| 4,523,229 | 6/1985 | Kanmoto | 358/461 |
| 4,695,884 | 9/1987 | Anastassiou et al. | 358/461 |
| 4,888,492 | 12/1989 | Arimoto | 358/448 |
| 4,903,145 | 2/1990 | Funada | 358/462 |
| 5,062,144 | 10/1991 | Murakami | 358/461 |
| 5,133,022 | 7/1992 | Weideman | 358/447 |
| 5,347,370 | 9/1994 | Ishihara et al. | 358/461 |
| 5,404,232 | 4/1995 | Selby | 358/406 |
| 5,471,319 | 11/1995 | Ogawa | 358/445 |

FOREIGN PATENT DOCUMENTS

| | | | |
|---|---|---|---|
| 0336410 | 4/1988 | European Pat. Off. | H04N 1/40 |
| 3-258163 | 11/1991 | Japan | H04N 1/40 |

*Primary Examiner*—Edward L. Coles, Sr.
*Assistant Examiner*—Tia M. Harris

[57] ABSTRACT

When an array of photodetecting elements has to be calibrated, normally a reference surface is scanned. Yet the reference surface is not an ideal surface and likely may include scratches or dust particles so that the signals read out from the array have to be corrected. A method and system of correction are provided in which the statistical distribution of the signals read out over the surface is evaluated for each photodetector. By this evaluation, dust and scratches can be disregarded before calculating a mean value representative of the sensitivity of each individual element.

36 Claims, 4 Drawing Sheets

METHOD OF AND APPARATUS FOR CORRECTING THE OUTPUT SIGNALS OF AN ARRAY OF PHOTODETECTOR ELEMENTS

FIELD OF THE INVENTION

The invention relates to a method of correcting the output signals from a plurality of photodetector elements, in which a reference surface is scanned to provide a plurality of output signals corresponding to the light intensity detected by each photodetector. A correction value is calculated for each photodetecting element and subsequent output signals from the photodetecting elements are then corrected utilizing the correction values. The invention also relates to an apparatus for correcting output signals in accordance with the method. The method and apparatus are preferably utilized in a scanner, more preferably in a copying apparatus.

BACKGROUND OF THE INVENTION

Scanning of documents is conventionally performed utilizing a plurality of photodetecting elements, such as a photoelectric cell array, e.g., of the CCD type. A problem with such arrays is that they do not provide uniform output signals. This non-uniformity is caused by the differences in sensitivity between the cells, fluctuations in the dark current, and variations in the illumination characteristics, as well as the transmission characteristics, of the optical system. In order to compensate for this non-uniformity, the signals from the photoelectric cells have to be corrected. Such correction is performed by scanning a uniform, preferably white, reference surface prior to the scan of the document and calculating correction values from the result of this scan.

A further problem occurs because the reference surface is not completely uniform but contains defects such as scratches and dust. In the prior art, various calculations have been proposed to overcome this problem. It has, e.g., been proposed to substitute values falling below a threshold with the mean value of the whole row of pixels or to simply average over a plurality of measurements, to reduce the influence of dust particles. A further approach is disclosed in U.S. Pat. No. 5,062,144. According to this document the reference surface is divided into regions within which an average of a plurality of measurements is calculated for each photoelectric cell. The regions are assumed to be wider than a dust particle on the surface. From these averaged values for each region, the maximal intensity value for each pixel is determined and used for the correction. However, it has been found that not only may dust particles give rise to false low values but also that scratches may provide too high intensity values. A method which, in part, considers this problem is disclosed in U.S. Pat. No. 5,347,370.

The method of U.S. Pat. No. 5,347,370 does not take the highest value but, e.g., the second or third highest value in accordance with a correction factor algorithm. In order to provide a simple apparatus with need for only a small memory, such a value (called the "median" value) is determined firstly for every block and then from these block values a global "median" value is calculated. This method has the disadvantage that all the values are taken into account for determining the "median" value, i.e., a wide dust particle or scratch may skew the measurement too much, and that no averaging is performed to reduce influence from noise.

SUMMARY OF THE PRESENT INVENTION

It is an object of the present invention to provide a correction method which overcomes the disadvantages of the prior art methods and which provides accurate results even when larger dust particles or scratches are present on the reference surface. It is a further object to provide an apparatus for correcting signals in accordance with this method.

This object is achieved by evaluating the statistical distribution of a plurality of output signals for each pixel to determine therefrom a correction value. This method does not require that the reference surface is divided into blocks, since dust particles and scratches are disregarded by the statistical evaluation. Further, because false values due to dust or scratches or noise are disregarded when calculating the correction value a higher accuracy is achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
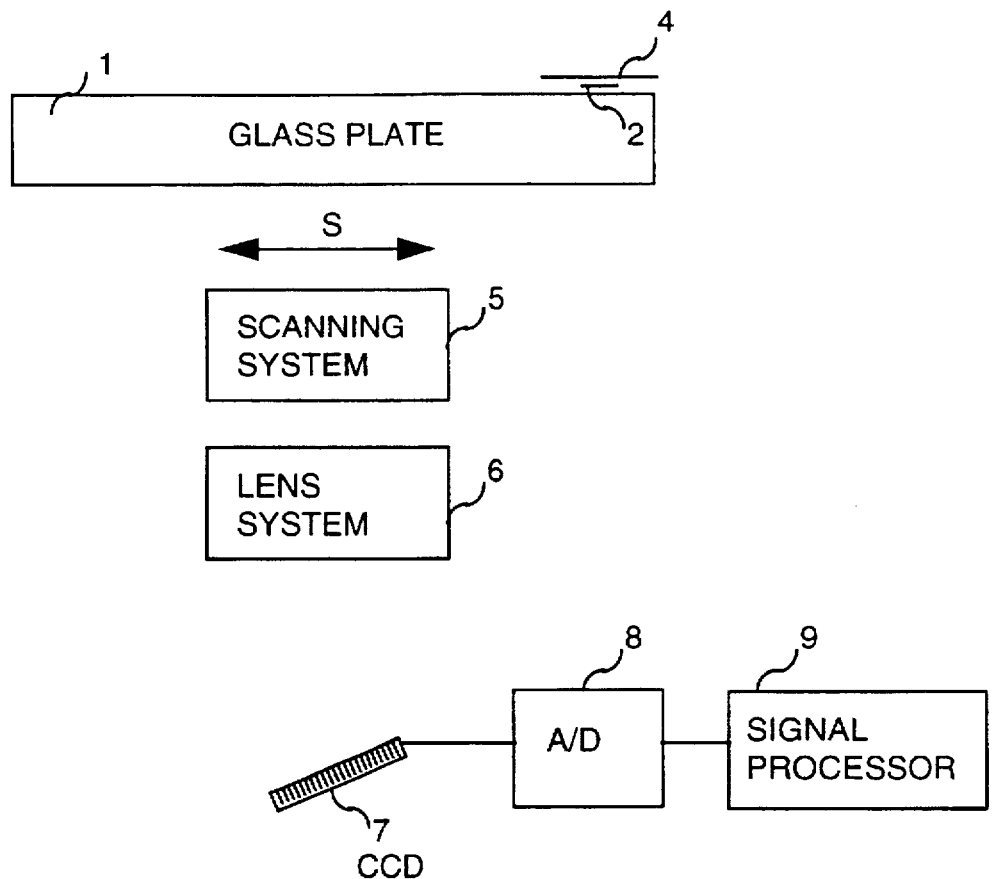
FIG. 1 is a schematic view of a scanning apparatus according to a preferred embodiment of the invention.

In FIG. 1, a scanning apparatus (that forms part of a copying machine) is schematically shown, and which is disposed in relation to a transparent glass plate 1 over which a document to be scanned is positioned by a transporting device (not shown). The transporting device positions the document over the transparent glass plate 1. A reference surface 2 is provided at one end of the plate 1, in a cover 4. During a reference scan, the reference surface is scanned in a main scan direction S by a scanning system, schematically shown at 5, including a light source and mirrors. The scanned image line is then focused in a sub-scan direction, preferably perpendicular to the main scan direction, by an imaging device 6 (such as a lens system) onto the photoelectric detector 7, which may be in the form of a charge-coupled-device (CCD) array. The signals are read out and converted into digital signals in a conventional manner by the read-out-and-converting, or A/D, device 8. The digital signals are then processed by a signal processing device 9 such as a general microprocessor or dedicated digital signal processing integrated circuit.

The signal processing device 9 calculates a correction value for each pixel and performs correction during scanning action. Such correction may include averaging the signals output from the CCD array, determining the statistical distribution, determining the correction value based upon evaluation of the statistical distribution and, in a memory, storing data needed for the evaluation and storing the calculated correction values. The reference scan is preferably performed each time the apparatus is switched-on.

Figure 2:
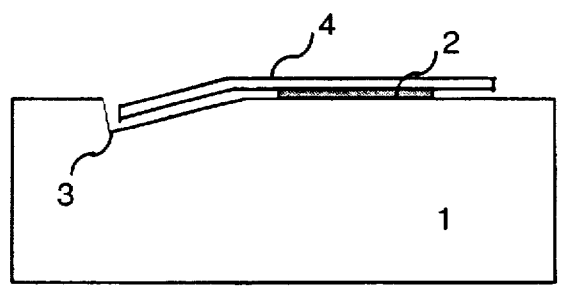
FIG. 2 shows the position of the reference strip and the construction of the cover in detail.

With reference to FIG. 2, the reference surface will be described in greater detail. The reference surface is preferably in the form of a strip 2 positioned in a cover 4. To provide approximately the same conditions for the reference surface as for the document to be scanned, the reference strip 2 is not fastened to the transparent plate 1 but is loosely placed onto the plate. As can be seen in FIG. 2, the support plate 4, e.g., a metal plate, is machined into an end part 3 of the transparent plate 1.

When a document to be scanned is transported over the transparent plate 1, it is important that no sharp edges are present which could damage the document. Therefore, the support plate 4 of FIG. 2 is machined into the transparent plate and so shaped that no sharp edges are provided. Further, the angle of the bend in the plate is important because too sharp a bend could damage the original document as it is transported over the glass plate. The reference strip 2 is, e.g., formed of a sheet of white material suitable as a white standard; such materials are well known in the art. On both sides of the sheet 2 there may provided glue for gluing the support plate 4 to the transparent plate 1. The sheet 2 is then positioned loosely under the support plate 4 between the gluing portions. Of course, the sheet 2 may also be glued to the support plate, or may be in the form of a layer coated onto the support plate. To prevent stray light from being reflected on the support plate and reentering the optical system, the plate may be coated black.

Figure 3:
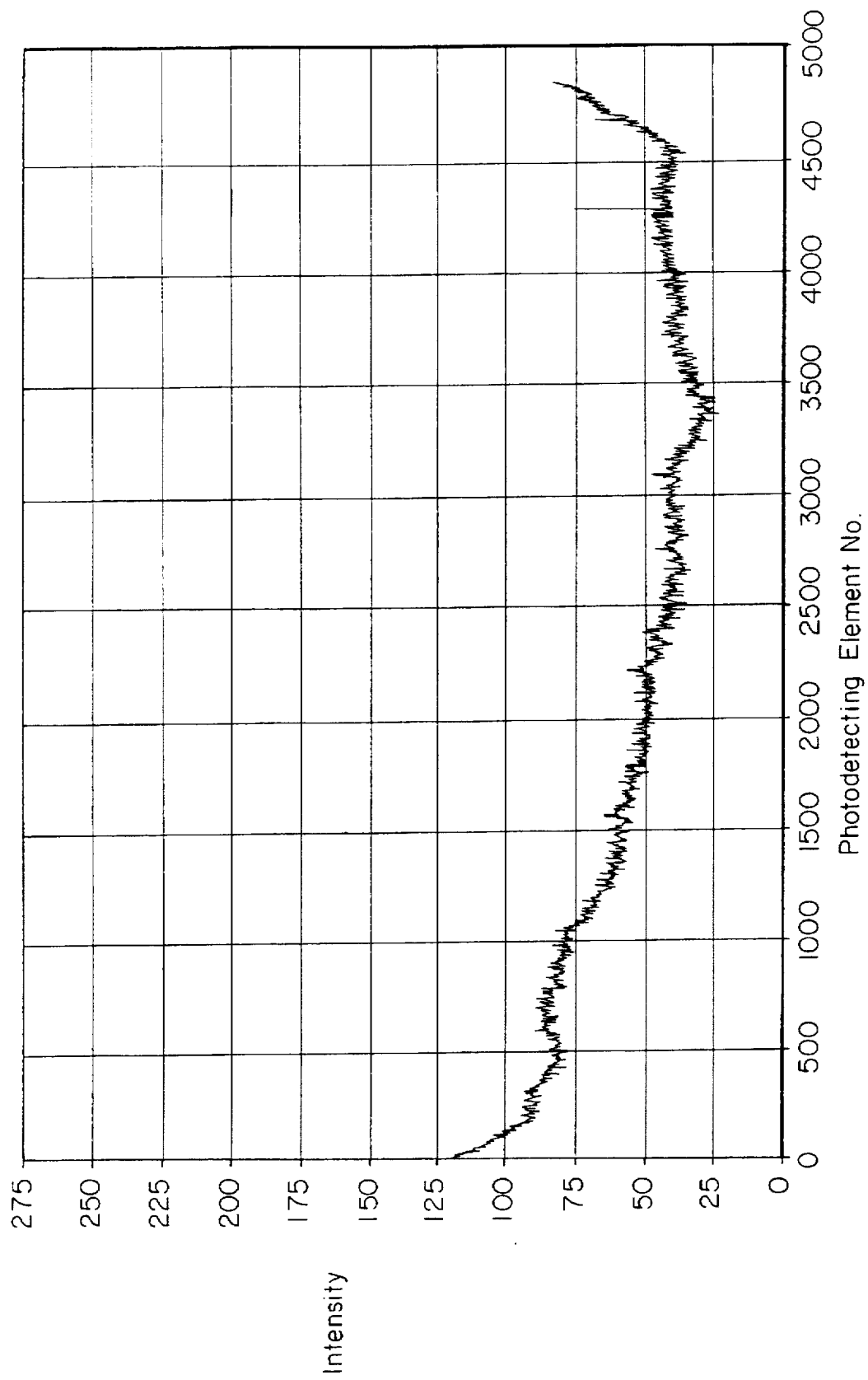
FIG. 3 is an example of the signals read out from the detector over one scan line.

FIG. 3 gives an example of signals read out from the detecting array 7 during a single scan. As can be seen in FIG. 3, the signal values for the different photodetecting elements are subjected to important variations besides the small variations due to differences in sensitivity between the individual photodetecting elements as well as noise.

Figure 4:
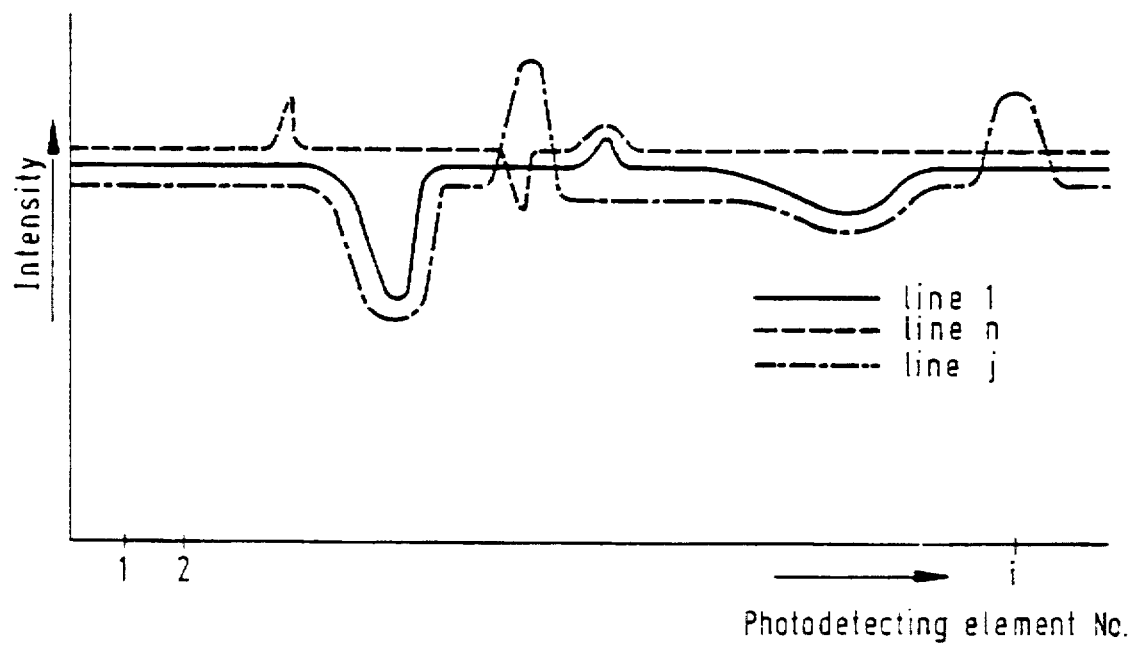
FIG. 4 is a schematic diagram showing sets of signals as outputted from the photodetecting elements.

FIG. 4 shows an example of sets of output signals from the array detector 7. The three different curves schematically indicate how three scanned lines may differ in output signals. If, e.g., a dust particle is present on the reference surface, a dip will occur for one or more of the detecting elements depending on the width of the dust particle. If the dust particle is large compared to the size of the detecting elements, then the dip in output signal will also occur for a plurality of scanned lines. On the other hand, if a scratch is present on the reference surface, an output signal is provided which is higher than the normal signal for a white surface. Further, also the lighting system 5, e.g., halogen lamps, is subjected to changes in light intensity which will have to be corrected. Moreover, the detected signals are also influenced by the lens system 6, stray light and reflections in the transparent plate 1, as well as electronic noise and dark currents. In order to eliminate the influence of the dark currents, preferably a part of the CCD array 7 is covered by an opaque plate and the signals from this part are taken as a measure of the dark current.

Because the present invention utilizes a statistical distribution for evaluation, it is not necessary to divide the surface into blocks as in the prior art. The surface can be scanned either continuously or step wise. In the latter case, the same part of the surface is measured a plurality of times and thereafter the scanning system is moved to another part which is then also measured a plurality of times. This procedure is repeated for the whole reference surface.

Figure 5:
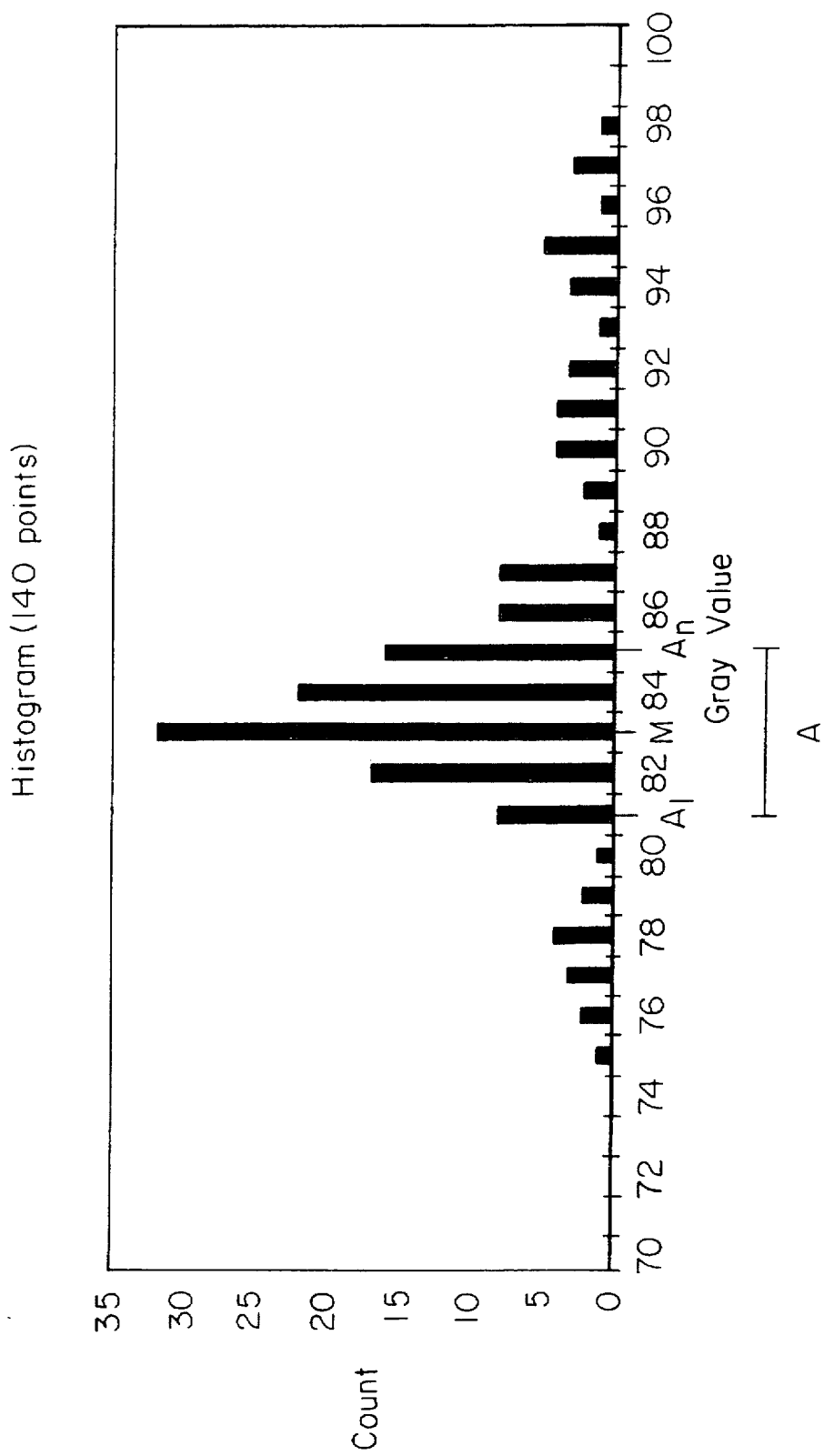
FIG. 5 is a diagram showing a possible statistical distribution of detected signals for one photodetecting element.

FIG. 5 gives an example of the statistical distribution of a plurality of output signals for a single detecting element. In the histogram of FIG. 5, only the signal values between 70 and 100 are shown. The actual measurement range is preferably from 0 to 255 with 0 representing ideal white and 255 representing ideal black. A large dust particle, e.g., will result in a plurality of occurrences with a very low intensity, as can be seen to the right in the diagram of FIG. 5. In this example, at least three different dust particles can be seen to have influenced the measurement: the first gave rise to values around 90–91, the second around 95 and the third around 97. On the other hand, a scratch will give rise to a number of occurrences having a high intensity, as can be seen to the left in the diagram, around the values 77–78. By evaluating the plurality of output signals for each detecting element in this way, disturbing signals due to, e.g., dust and scratches can effectively be eliminated. This is done by neglecting signals which are too high or too low when calculating the correction value for the respective detecting element. Further, by calculating a mean value of all relevant signals, errors due to, e.g., noise are effectively reduced.

In a preferred embodiment such evaluation is performed in the following manner:

(a) determine the statistical distribution of the output signals for each detecting element;

(b) determine, for a specific element, the signal value (=max value) which has the highest number of occurrences (in the example of FIG. 5, this would be the value M);

(c) determine an area (A) around the max value in which the signal values should be taken into account (in FIG. 5, the area (A) corresponds to the values A1 . . . An);

(d) calculate a mean value for the area (A);

(e) designate the calculated mean value as the correction value for the specific detecting element to be used when correcting the output signals from this element;

(f) repeat steps (b) to (e) for each detecting element; and (g) store correction values for use during scanning action.

The above cited method steps are preferably implemented by the signal processing device 9.

In another embodiment of the present invention, the output signals over a plurality of scanned lines may be averaged to provide a plurality of averaged signals for each detecting element. For example, 140 measurements could be made for each photodetector in the array. These 140 measurements could be divided into 14 groups of 10 measurements each, for which 14 average values could be determined. The scanned lines used to provide data for the average calculations may either be taken from the same image line (which is then scanned a plurality of times) or from a plurality of adjacent image lines. The evaluation of the statistical distribution is then performed on the basis of the averaged signals, e.g., the averages rather then new measurement data are plotted as a histogram. This has the advantage of reducing noise before the statistical evaluation is performed and thus enhancing the possibility of neglecting unwanted signals caused by dust and scratches.

The area selected around the max value is so determined that as many of the relevant signal values as possible are taken into account. Preferably 50%, more preferably 70–80%, of the total values should be within the designated area. The size of the area may be determined by conventional statistic analysis, e.g., based upon the standard deviation. Preferably, the size of the area is based upon a predetermined typical standard deviation calculated at manufacturing for a typical array of photodetectors and a glass plate without dust or scratches. It has been determined experimentally that an area defined to between 2 and 5 times the standard deviation, more preferably to 4 times the standard deviation, gives good results.

Although in FIG. 5 the area A is shown as being symmetrical around the max value M, the area could also be determined asymmetrically depending on the circumstances. Another way of determining the area is to start at the max value (M) and then increase the number of values considered relevant on both sides of the max value until a satisfactory number of values have been included. This increase may be performed symmetrically around the max value (M) or, if preferred, asymmetrically to take e.g., a specific number of signal values into account on each side of the max value.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of correcting the output signal from one of a plurality of photodetecting elements, comprising the steps of:

scanning a reference surface to provide a plurality of light intensity signals of said photodetecting element corresponding to a set of scanning positions of said photodetecting element relative to said reference surface;

calculating an individual correction value for said photodetecting element by evaluating a histogram of said plurality of light intensity signals of the photodetecting element; and correcting the output data from the photodetecting element on the basis of said individual correction value.

2. A method according to claim 1, wherein the step of calculating includes determining a signal value M having the maximum number of occurrences.

3. A method according to claim 2, wherein the step of calculating the individual correction value further includes determining an area A around the signal value M.

4. A method according to claim 3, wherein the step of calculating further includes determining a mean value from the signal values lying within said determined area A.

5. A method according to claim 3, wherein said area A corresponds to an area around the value M of between 2 and 5 times the standard deviation for a predetermined statistical distribution.

6. A method according to claim 3, wherein the step of determining said area A includes increasing an area around the signal value M until a desired number of values is included in said area A.

7. A method according to claim 1, wherein the step of calculating includes averaging a plurality of said output signals for each detecting element to provide a plurality of averaged signals for each element, and basing said evaluation of the statistical distribution upon said averaged signals.

8. A method according to any of claim 1, wherein the step of scanning continuously scans the reference surface.

9. A method according to any of claim 1, wherein the step of scanning stepwise-scans the reference surface.

10. An apparatus for correcting the output signal from one of a plurality of photodetecting elements, comprising:

a reference surface;

one of a plurality of photodetecting elements;

means for scanning the reference surface so as to provide a plurality of light intensity signals of said photodetecting element corresponding to a set of scanning positions of said photodetecting element relative to said reference surface;

means for calculating an individual correction value for said photodetecting element by evaluating a histogram of said plurality of light intensity signals of the photodetecting element; and means for correcting the output data from the photodetecting element on the basis of said individual correction value.

11. An apparatus according to claim 10, wherein the means for calculating includes means for determining a value M having the maximum number of occurrences.

12. An apparatus according to claim 11, wherein the means for calculating includes area means for determining an area A around the value M of relevant values.

13. An apparatus according to claim 12, wherein the means for calculating includes average means for determining a mean value from the signal values lying within said determined area A.

14. An apparatus according to claim 12, wherein the area means determines said area A to be an area around the value M of between 2 and 5 times the standard deviation for a predetermined statistical distribution.

15. An apparatus according to claim 12, wherein the area means determines said area A by increasing an area around the value M until a desired number of values is included in said area.

16. An apparatus according to claim 10, further including:

means for averaging a plurality of said output signals to provide a plurality of averaged signals, wherein said means for calculating evaluates the statistical distribution based upon said averaged signals.

17. An apparatus according to claim 10, wherein the scanning means scans the reference surface continuously.

18. An apparatus according to claim 10, wherein the scanning means scans the reference surface stepwise.

19. A method of determining a calibration value for a photodetector in an array of photodetectors, the method comprising the steps of:

scanning a reference surface with the array to provide a plurality of light intensity signals of said photodetector corresponding to a set of scanning positions of said photodetector relative to said reference surface;

determining a histogram of intensity values for said photodetector; and forming a calibration value for said photodetector based upon the histogram.

20. A method as in claim 19, wherein the step of forming includes:

selecting a subset of values in a statistical distribution of each photodetector;

calculating a statistical parameter for each subset; and assigning the statistical parameter of each subset as the calibration value for the corresponding photodetector.

21. A method as in claim 20, wherein:

the step of calculating includes calculating a mean value of the subset.

22. A method as in claim 20, wherein:

the step of selecting includes selecting the subset based upon the mode of the statistical distribution.

23. A method as in claim 22, wherein:

the step of selecting includes selecting a contiguous range of values in which is included the mode.

24. A method as in claim 23, wherein:

the step of selecting includes setting a width, W, of the range by expanding a width of the range until a predetermined number of values are included therein.

25. A method as in claim 19, wherein the step of determining includes:

dividing the plurality of measured intensity values into a predetermined number of groups;

averaging each group of measured values; and obtaining the statistical distribution of the average values of the groups.

26. An apparatus for determining a calibration value for a photodetector in an array of photodetectors, the apparatus comprising:

determining means for determining a histogram of intensity values of said photodetector based upon a plurality of light intensity signals of said photodetector obtained during scanning of a reference surface, said plurality of light intensity signals corresponding to a set of scanning positions of said photodetector relative to said reference surface; and forming means for forming a calibration value for said photodetector based upon the histogram.

27. An apparatus as in claim 26, wherein the forming means includes:

selector means for selecting a subset of values in a statistical distribution of each photodetector;

calculator means for calculating a statistical parameter for each subset; and assigning means for assigning the statistical parameter of each subset as the calibration value for the corresponding photodetector.

28. An apparatus as in claim 27, wherein:

the calculator means calculates a mean value of the subset.

29. An apparatus as in claim 27, wherein:

the selector means selects the subset based upon the mode of the statistical distribution.

30. An apparatus as in claim 29, wherein:

the selector means selects a contiguous range of values in which is included the mode.

31. An apparatus as in claim 30, wherein:

the selector means sets a width, W, of the range by expanding a width of the range until a predetermined number of values are included therein.

32. An apparatus as in claim 26, wherein the determining means includes:

partitioning means for dividing the plurality of measured intensity values, of each photodetector, into a predetermined number of groups;

averaging means for averaging each group of measured values; and obtaining means for obtaining, for each photodetector, the statistical distribution of the average values of the groups corresponding to the photodetector.

33. A method according to claim 1, wherein said step of scanning provides pluralities of said light intensity signals for each of said photodetecting elements, respectively, and said steps of calculating and correcting are repeatedly performed so that the output data from said photodetecting elements are individually corrected based upon the histograms associated with the photodetecting elements, respectively.

34. An apparatus according to claim 10, wherein said means for scanning provides pluralities of said light intensity signals for each of said photodetecting elements, respectively, and said means for calculating and said means for correcting are operable to perform repeatedly for each of said plurality of photodetecting elements so that the output data from said photodetecting elements are individually corrected based upon the histograms associated with the photodetecting elements, respectively.

35. A method according to claim 19, wherein said step of scanning provides pluralities of said light intensity signals for each of said photodetecting elements in said array, respectively, and said steps of determining and forming are repeatedly performed so that the output data from said photodetecting elements are individually corrected based upon the histograms associated with the photodetecting elements, respectively.

36. An apparatus according to claim 26, wherein said determining means is provided with pluralities of said light intensity signals for each of said photodetecting elements in said array, respectively, and said determining means and said forming means are operable to perform repeatedly for each of said plurality of photodetecting elements so that the output data from said photodetecting elements are individually corrected based upon the histograms associated with the photodetecting elements, respectively.

\* \* \* \* \*